INVENTOR
CARL P. BUDKE

ATTORNEYS

United States Patent Office 3,353,870
Patented Nov. 21, 1967

3,353,870
METHOD AND APPARATUS FOR RECOVERING A NATURALLY OCCURRING BRINE CONTAINING SODIUM CARBONATE
Carl P. Budke, Lone Pine, Calif., assignor to Pittsburgh Plate Glass Company, Pittsburgh, Pa., a corporation of Pennsylvania
Filed June 1, 1965, Ser. No. 460,445
6 Claims. (Cl. 299—5)

ABSTRACT OF THE DISCLOSURE

Method of recovering a naturally occurring brine containing sodium carbonate is shown in which sumps are provided with apertures located in the bottom thereof. The naturally occurring deposit is ditched laterally from the sumps to the depth of the openings a considerable distance from the sump, 300 to 3,000 feet being typical. Activation of a pump associated with the sump draws brine laterally to the sump along the ditch and across and through the deposits above those located at the bottom of the ditch to provide an enriched sodium carbonate liquor to the sump. Means to close the communication to the sump from any ditch are provided when the carbonate concentration falls below 8 percent by volume sodium carbonate.

---

The present invention relates to the recovery of brine from a salt body. More particularly, the present invention relates to the recovery of naturally occurring brines from sensibly dried up salt lakes, such as Owen's Lake, Searle's Lake, and China Lake of California, and other salt bodies.

The recovery of naturally occurring brines from dried up salt lakes, for example, Owen's Lake in California, is a particularly bothersome problem because of the severe temperature changes which occur during the various seasons of the year. These atmospheric changes coupled with the quantities of water run off from the Sierra Nevada Mountains in the area, cause drastic changes in the underlying fluid composition of the lake, rendering recovery of naturally occurring brines on a consistent composition basis extremely difficult. In addition, the salt deposits in these lakes are stratified between brine layers at various depths. Thus, between the lake surface and the clay on the lake bottom there will typically be positioned several horizontal layers of salt separated from one another by horizontal brine layers.

The major difficulty for example in extracting these brines from Owen's Lake is one of obtaining consistently high specific gravity brines containing a satisfactory $Na_2CO_3$ content. When pumping of these brines from a given salt strata is attempted in salt bodies of this type, diluted brines often result due to the two directional flows that are encountered in these lakes. Thus, when pumping is attempted in lakes of this character, brine tends to flow in a horizontal direction as well as in a vertical direction to the pump source. Those brines lying near the surface of the salt body tend to be weak. Those lying at deeper levels in the salt body tend to be stronger and generally possess an acceptable specific gravity and salt content.

In accordance with this invention, a method of recovering brines from a naturally occurring salt body is provided which gives rise to the recovery of naturally occurring brines containing the desired qualities of specific gravity and sufficient salt content for the efficient recovery of the salts contained therein. Salt as used herein is used generically to include all salts found in a given brine and not just NaCl. Thus, in accordance with this invention, an enclosed sump is positioned in the salt body from which the naturally occurring brine is to be recovered.

The installation of this surface well must be made in a dry location. Thus, locations which are subject to surface flooding are not normally suitable for the installation of the surface well hereinafter described. The sump is provided with a plurality of openings adjacent the bottom portion thereof, usually 1 or 2 inches above the bottom member. These openings are provided for the admission of brine to the interior of the sump. Once the sump and pump have been installed, a plurality of ditches are dug from the surface of the salt body at least to the level of the openings in the sump, at least one ditch being provided for each opening.

These ditches which typically run in depth from the surface to at least the level of the opening in the bottom portion of the sump from 1 to 3 feet in width and generally are dug for distances of 300 to 3000 feet in length. As will be obvious to one skilled in the art and familiar with a salt body such as the Owen's Lake or Searle's Lake, once these ditches have been dug, they will present a mushy or liquid appearance to the eye, rather than the solid crust of salt that is normally encountered on the surface prior to their being dug. When the pump is activated in the sump, liquid material is drawn into the sump from the surrounding ditches. This liquid in its path of travel, which is a considerable distance through the horizontally disposed salt layers, results in enrichment of the liquid as it enters the ditch and travels to the sump itself. The ditches provide brines from various levels in the salt lake so that diluted brine from upper strata is mixed with the stronger brine encountered in the lower level of the salt body. This enrichment of the liquid provides the specific gravity and salt content for the efficient recovery of the salt content of the brines which enter the sump and which are ultimately pumped to recovery units.

For a more complete understanding of the present invention, reference is made to the accompanying drawing in which.

Figure 1:
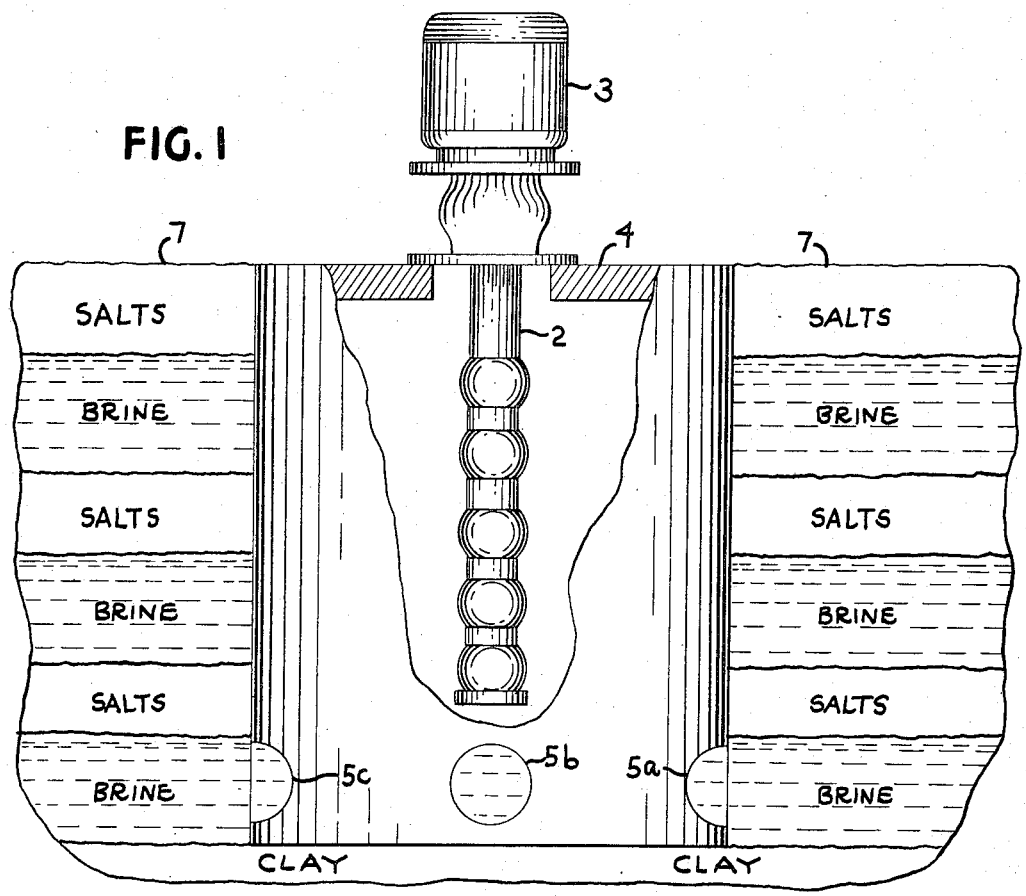
FIGURE 1 shows the positioning of a sump in a layered salt body.

With respect to FIGURE 1, the sump consists of a hollow casing 1 having positioned therein a pump member 2 provided with a motor 3. The motor is mounted on the cover 4 of the sump and the sump member has located in the bottom portion thereof a plurality of openings 5A, 5B, and 5C. The upper level of the salt body is indicated generally by the numeral 7.

Figure 2:
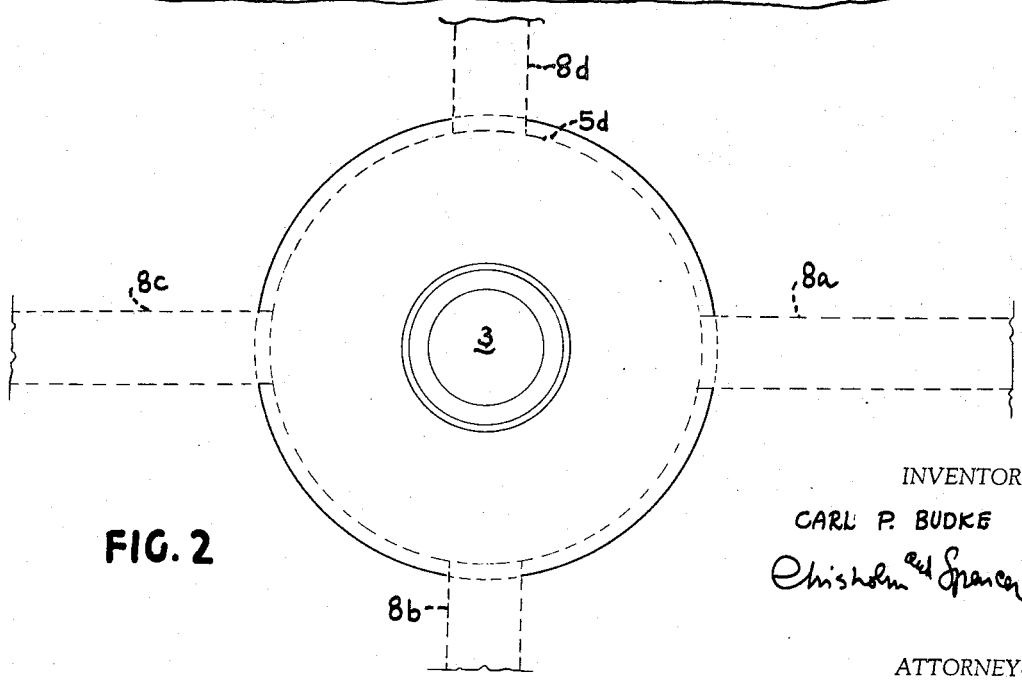
FIGURE 2 shows a cross section of FIGURE 1 taken along the lines 1—1 showing the positioning of the ditches with respect to the openings contained in the side of the sump.

In FIGURE 2, ditches 8A, 8B, and 8C are shown which are in communication with openings 5A, 5B, and 5C, respectively. A fourth ditch, 8D, is also shown, and this is in communication with an opening 5D, not shown in FIGURE 1.

As will be readily understood, the ditches, as has been previously stated, may be extended a considerable distance out into the salt body and thus ditches even on the order of 1 mile to 2 miles in length will be suitable, provided an adequate pumping rate can be achieved. In addition, while the ditches are shown with respect to a single sump, it is of course to be understood that a network of sumps can be provided in the salt body so that the ditches interconnect between more than one sump for a given pumping operation.

The important consideration is to provide a suitably adequate path of travel for the brine to the sump mechanism and an adequate pumping rate within the sump to effectively remove the brine containing a sufficient quantity of salt therein to make a recovery thereof economical.

In general, the vertical pump provided in the sumps in accordance with this invention is rated at 300 to 400 gallons per minute capacity, but this capacity can be greater or lesser than this rate if desired for a given operation. Preferably in the operation of this system, ditches 300 to 800 feet in length are employed, and the ditches are preferably 3 feet wide or wider. Ditches of this character are found to be subject to less bridging caused by salt precipitation during operation.

With respect to the content of the material recovered in wells of this character, operations are conducted in these wells to provide a preferably 9.5 to 12.5 percent by volume $Na_2CO_3$ therein. Generally, the specific gravity of the brines falls between 11 and 13.

A further consideration in the operation of these wells is the fact that while a plurality of ditches is employed, when conditions are such in a given ditch that weak brine is being produced, the hole leading to the sump connected with that ditch may be plugged or otherwise closed so that only high specific gravity brines containing an acceptable quantity of sodium carbonate are fed to the sump. Since atmospheric conditions will change the character of brine flowing in open ditches, it will be understood that these ditches can be covered during periods of heavy rainfall to prevent brine dilution or in winter months to avoid freezing in the ditches. While the invention has been described with reference to certain specific examples and illustrative embodiments, it is to be understood that the invention is not to be limited thereby except insofar as appears in the accompanying claims.

What is claimed is:

1. A method of recovering a naturally occurring brine containing sodium carbonate comprising positioning a sump in an excavation in said salt body, the bottom of said sump being positioned at least 3 feet below the surface of said salt body, providing a plurality of ports in the side of said sump and adjacent the bottom thereof, providing a ditch from said ports into the salt body to the surface of the body, said ditch being at a depth at least equal to the depth of said ports and extending laterally therefrom a considerable ditsance, pumping brine from said ditches through said ports and into the sump, thereby causing liquid positioned adjacent the ditches to travel a considerable distance through the horizontally disposed salt layers to thereby produce an enriched liquid entering the ditch.

2. A method of recovering a sodium carbonate containing brine from a naturally occurring salt body adjacent the surface of the earth comprising positioning in said salt body a closed container for the collection of brine, providing pumping means in said container and a plurality of openings in said container adjacent the bottom thereof and in communication with said salt body, ditching said salt body to provide a plurality of ditches in communication with said openings and the surface, said ditches extending laterally from said container a considerable distance, pumping brine from said ditches to said container through said openings to provide a travel path for liquid through horizontally disposed salt layers to said ditch and to cause the commingling of diluted brines from upper strata with concentrated brines from lower strata during its path of travel in said ditch, closing any opening in said sump when its associated ditch contains below 8 percent by volume $Na_2CO_3$.

3. A vertical surface well for removing brine from a naturally occurring salt body adjacent the surface comprising a sump closed on all sides, the top and bottom, a plurality of openings in said sump in communication with the interior of the sump and the salt body, a plurality of ditches in said salt body extending laterally from said openings, said ditches being open to the surface of the salt body, and means positioned in said sump for pumping brine from said ditches through said openings and into said sump.

4. The method of claim 1 wherein a port is closed when the brine in its associated ditch falls below 8 percent by volume $Na_2CO_3$.

5. The method of claim 1 wherein brine is pumped at the rate of 300 to 400 gallons per minute.

6. The method of claim 1 wherein said ditches extend laterally from said ports from between 300 to 3000 feet.

References Cited

UNITED STATES PATENTS

| | | | |
|---|---|---|---|
| 390,780 | 10/1888 | Heaton | 61—10 X |
| 685,028 | 10/1901 | Brown | 37—58 |
| 804,092 | 11/1905 | Brants | 61—10 |
| 2,625,384 | 1/1953 | Pike et al. | 299—5 X |
| 2,740,476 | 4/1956 | D'Audiffret et al. | 166—50 X |
| 2,847,202 | 8/1958 | Pullen | 299—4 |

ERNEST R. PURSER, *Primary Examiner.*